US008622555B2

(12) United States Patent
Krishnan et al.

(10) Patent No.: US 8,622,555 B2
(45) Date of Patent: Jan. 7, 2014

(54) SECURITY ARTICLE HAVING A SWITCHING FEATURE

(75) Inventors: Vivek Krishnan, St. Paul, MN (US); Gaurav Manik, Muzaffarnagar (IN); Gajendra Rao, Bangalore (IN)

(73) Assignee: 3M Innovative Properties Company, St. Paul, MN (US)

( * ) Notice: Subject to any disclaimer, the term of this patent is extended or adjusted under 35 U.S.C. 154(b) by 289 days.

(21) Appl. No.: 12/872,637

(22) Filed: Aug. 31, 2010

(65) Prior Publication Data

US 2012/0050863 A1    Mar. 1, 2012

(51) Int. Cl.
*G02B 5/128*    (2006.01)
(52) U.S. Cl.
USPC .......................................... 359/536; 359/540
(58) Field of Classification Search
USPC ......... 359/241, 534, 536–538, 540, 581, 586; 726/17, 20, 21
See application file for complete search history.

(56) References Cited

U.S. PATENT DOCUMENTS

| | | | |
|---|---|---|---|
| 3,801,183 A | | 4/1974 | Sevelin et al. |
| 4,367,920 A | * | 1/1983 | Tung et al. ............ 359/538 |
| 4,688,894 A | | 8/1987 | Hockert |
| 5,777,791 A | * | 7/1998 | Hedblom ............ 359/536 |
| 5,822,120 A | * | 10/1998 | Palazzotto et al. ....... 359/515 |
| 5,959,775 A | * | 9/1999 | Joseph et al. ........ 359/538 |
| 6,247,818 B1 | * | 6/2001 | Hedblom et al. ....... 359/540 |
| 6,966,660 B1 | * | 11/2005 | Buccellato et al. ....... 359/540 |
| 7,513,941 B2 | | 4/2009 | Frey et al. |
| 7,727,617 B2 | * | 6/2010 | Lee et al. ............ 428/195.1 |
| 8,274,727 B1 | * | 9/2012 | Yap et al. ............ 359/241 |
| 2003/0090800 A1 | * | 5/2003 | Humpal et al. ........ 359/551 |
| 2003/0170425 A1 | | 9/2003 | Mann et al. |
| 2011/0193335 A1 | * | 8/2011 | Budd et al. ............ 283/75 |

FOREIGN PATENT DOCUMENTS

| | | |
|---|---|---|
| WO | WO 01/29587 | 4/2001 |
| WO | WO 03/087895 | 10/2003 |
| WO | WO 2009/105142 | 8/2009 |

* cited by examiner

*Primary Examiner* — Frank Font
(74) *Attorney, Agent, or Firm* — Sandra K. Nowak

(57) ABSTRACT

A security laminate for authenticating an article and a method for authenticating articles is disclosed. The security laminate includes a transparent binder layer and retroreflective microspheres such that the security laminate exhibits a covert switching effect when exposed to particular conditions.

20 Claims, 5 Drawing Sheets

SECURITY ARTICLE HAVING A SWITCHING FEATURE

TECHNICAL FIELD

The present invention relates to security laminates and articles having retroreflective microspheres.

BACKGROUND OF THE INVENTION

Documents of value such as passports, identification cards, driver's licenses, entry passes, ownership certificates, financial instruments, and the like, are often assigned to a particular person by personalization data. Personalization data, often present as printed images, can include photographs, signatures, fingerprints, personal alphanumeric information, and barcodes, and allows human or electronic verification that the person presenting the document for inspection is the person to whom the document is assigned. There is widespread concern that forgery techniques can be used to alter the personalization data on such a document, thus allowing non-authorized people to pass the inspection step and use the document in a fraudulent manner.

A number of security features have been developed to help authenticate a document of value or object of value, thus assisting in preventing counterfeiters from altering, duplicating or simulating a document of value or object of value. Some of these security features may include overt security features or covert security features. Overt security features are features that are easily viewable to the unaided eye. Such features may include holograms and other diffractive optically variable images, embossed images, and color-shifting films. In contrast, covert security features include images only visible under certain conditions, such as inspection under light of a certain wavelength, polarized light, or retroreflected light. One example of a laminate that may include both overt and covert security features is 3M Confirm™ Security Laminate, which is commercially available from 3M Company of St. Paul, Minn. This security laminate may be used with documents of value, such as identification cards, badges, and driver licenses, or objects of value, and assists in providing identification, authentication, and to help protect against counterfeiting, alteration, duplication, and simulation. Another example of a laminate that includes both overt and covert security features is illustrated in U.S. Pat. Publication No. 2003/0170425 A1 "Security Laminate" (Mann et al.). Examples of some other devices are taught in U.S. Pat. Nos. 3,801,183 and 4,688,894.

WO 09/105,142 describes an example of a security laminate which includes a first substrate having a first major surface and a second major surface. A plurality of retroreflective elements are affixed along the first major surface of the substrate. The retroreflective elements include a solid spherical core having an outer core surface, and the outer core surface provides a first interface. The retroreflective elements also include a first complete concentric optical interference layer having an inner surface overlying the core surface and an outer surface, the outer surface of the first complete concentric optical interference layer providing a second interface. The retroreflective elements further include a second complete concentric optical interference layer having an inner surface overlying the outer surface of the first complete concentric optical interference layer and an outer surface, the outer surface of the second complete concentric optical interference layer providing a third interface. The security laminate is retroreflective.

WO 01/29587 describes an exposed-lens retroreflective article exhibiting retroreflection under dry and wet conditions. The article comprises a first set of optical elements having a first reflective layer disposed on the embedded portion of the elements. The first set contributes mainly to dry retroreflection. The article further comprises a second set of optical elements having a second reflective layer behind a spacing layer. The second set contributes mainly to wet retroreflection. In one embodiment, the first and second sets of optical elements have substantially the same average diameters, refractive index, and density.

U.S. Pat. No. 5,777,791 describes a pavement marking article exhibiting dry and wet reflective characteristics. The article comprises a first set of optical elements having a refractive index between 1.9 and 2.0 protruding from a binder layer having particles of specular reflective pigment. These elements mainly contribute to dry reflection. The article further comprises a second set of optical elements having a refractive index between 2.2 and 2.3 which mainly contribute to wet reflection.

Although the commercial success of available security features has been impressive, as the capabilities of counterfeiters continue to evolve, it is desirable to further improve the ability to indicate that a security feature has been tampered with or somehow compromised to help protect against counterfeiting, alteration, duplication, and simulation.

SUMMARY OF THE INVENTION

An exemplary embodiment of the present invention provides a security laminate having a transparent binder layer, a first plurality of retroreflective microspheres in a first area, and a second plurality of retroreflective microspheres in a second area. The first plurality of retroreflective microspheres and the second plurality of retroreflective microspheres protrude from the binder layer, and the first plurality of retroreflective microspheres includes dry retroreflective microspheres and the second plurality of microspheres includes wet retroreflective microspheres. Under a first condition, the brightness of the first plurality of retroreflective microspheres is greater than the brightness of the second plurality of microspheres. Under a second condition, the brightness of the second plurality of retroreflective microspheres is greater than the brightness of the first plurality of retroreflective microspheres. The first condition may include retroreflective light and a first medium exhibiting a specified refractive index in contact with the first and second pluralities of retroreflective microspheres, and the second condition may include retroreflective light and a second medium exhibiting a specified refractive index in contact with the first and second pluralities of retroreflective microspheres. The first medium may exhibit a refractive index between 1.00 and 1.20, and the second medium may exhibit a refractive index between 1.25 and 1.35. In an exemplary embodiment, the first plurality of retroreflective microspheres includes retrochromic microspheres and/or one or more concentric optical interference layers. The security laminate may further include a substrate having indicia thereon positioned below the first plurality of retroreflective microspheres and second plurality of retroreflective microspheres. A security laminate of the present invention may be used to authenticate an object to which the security laminate is attached.

In an exemplary embodiment, a security laminate of the present invention includes a substrate having indicia thereon, a transparent binder layer, a first plurality of retroreflective microspheres in a first area positioned over a first portion of the indicia, and a second plurality of retroreflective microspheres in a second area positioned over a second portion of the indicia. The first plurality of retroreflective microspheres and the second plurality of retroreflective microspheres protrude from the binder layer, and the first plurality of retroreflective microspheres includes dry retroreflective microspheres, and the second plurality of microspheres includes wet retroreflective microspheres. Under a first condition, the brightness of the first plurality of retroreflective microspheres is greater than the brightness of the second plurality of microspheres, and under a second condition, the brightness of the second plurality of retroreflective microspheres is greater than the brightness of the first plurality of retroreflective microspheres. The first condition may include retroreflective light and a first medium exhibiting a specified refractive index in contact with the first and second pluralities of retroreflective microspheres and the second condition may include retroreflective light and a second medium exhibiting a specified refractive index in contact with the first and second pluralities of retroreflective microspheres. The first medium may exhibit a refractive index between 1.00 and 1.20, and the third medium may exhibit a refractive index between 1.25 and 1.35.

In another exemplary embodiment, under a first condition, the first and second portions of the indicia are viewable, under a second condition, the first plurality of retroreflective microspheres at least partially hide the first portion of the indicia and the second portion of the indicia is viewable, and under a third condition, the first portion of the indicia is viewable and the second plurality of retroreflective microspheres at least partially hide the second portion of the indicia. The first condition may include ambient light and a first medium exhibiting a specified refractive index in contact with the first and second pluralities of retroreflective microspheres, the second condition may include retroreflective light and a second medium exhibiting a specified refractive index in contact with the first and second pluralities of retroreflective microspheres, and the third condition may include retroreflective light and a third medium exhibiting a specified refractive index in contact with the first and second pluralities of retroreflective microspheres. The first medium may exhibit a refractive index between 1.00 and 1.20, the second medium may exhibit a refractive index between 1.00 and 1.20, and the third medium may exhibit a refractive index between 1.25 and 1.35. The first plurality of retroreflective microspheres may include retrochromic microspheres and/or one or more concentric optical interference layers. In an exemplary embodiment, a security laminate may further include an adhesive layer, wherein the substrate comprises a first major surface and a second major surface opposite the first major surface, and wherein the transparent binder layer is on the first major surface of the substrate and the adhesive layer is on the second major surface of the substrate.

In another exemplary embodiment, a security laminate of the present invention includes a transparent binder layer, and a plurality of retroreflective microspheres including dry retroreflective microspheres and wet retroreflective microspheres. The plurality of retroreflective microspheres protrude from the binder layer and are positioned in an area of the security laminate, and at least a portion of the plurality of retroreflective microspheres include one or more complete concentric optical interference layers. Under a first condition, the area of the security laminate exhibits a color, and under a second condition, the area of the security laminate exhibits a different color. The first condition may include retroreflective light and a first medium exhibiting a specified refractive index in contact with the plurality of retroreflective microspheres, and the second condition may include retroreflective light and a second medium exhibiting a specified refractive index in contact with the plurality of retroreflective microspheres. The first medium may exhibit a refractive index between 1.00 and 1.20 and the second medium may exhibit a refractive index between 1.25 and 1.35. The dry retroreflective microspheres may include retrochromic microspheres. The security laminate may used to authenticate an object to which the security laminate is attached.

The present invention provides a method of authenticating an article, including the steps of providing a security laminate including a substrate having indicia thereon, a transparent binder layer, a first plurality of dry retroreflective microspheres in a first area positioned over a first portion of the indicia, and a second plurality of wet retroreflective microspheres in a second area positioned over a second portion of the indicia. The first plurality of dry retroreflective microspheres and the second plurality of wet retroreflective microspheres protrude from the binder layer. The method further includes the steps of exposing the security laminate to a first condition and observing the security laminate under the first condition to determine the viewability of the first portion of the indicia and the second portion of the indicia, exposing the security laminate to a second condition and observing the security laminate under the second condition to determine the viewability of the first portion of the indicia and the second portion of the indicia, exposing the security laminate to a third condition and observing the security laminate under the third condition to determine the viewability of the first portion of the indicia and the second portion of the indicia, and authenticating the article, if, under the first condition, the first portion of the indicia and the second portion of the indicia are viewable, under the second condition, the first plurality of retroreflective microspheres at least partially hide the first portion of the indicia and the second portion of the indicia is viewable, and under the third condition, the first portion of the indicia is viewable and the second plurality of retroreflective microspheres at least partially hide the second portion of the indicia. In an exemplary method, the first condition includes ambient light and a first medium exhibiting a specified refractive index in contact with the first and second pluralities of retroreflective microspheres, the second condition includes retroreflective light and a second medium exhibiting a specified refractive index in contact with the first plurality of retroreflective micro spheres, and the third condition includes retroreflective light and a second medium exhibiting a specified refractive index in contact with the second plurality of retroreflective microspheres. The first medium may exhibit a refractive index between 1.00 and 1.20, the second medium may exhibit a refractive index between 1.00 and 1.20, and the third medium may exhibit a refractive index between 1.25 and 1.35.

Another exemplary method of authenticating an article includes the steps of providing a security laminate including a transparent binder layer, and an area having a plurality of retroreflective microspheres comprising dry retroreflective microspheres and wet retroreflective microspheres. The plurality of retroreflective microspheres protrude from the binder layer, and at least a portion of the plurality of retroreflective microspheres include one or more concentric optical interference layers. The method further involves the steps of exposing the security laminate to a first condition and observing the area having a plurality of retroreflective microspheres for a color under the first condition, exposing the security laminate to a second condition and observing the area having a plurality of retroreflective microspheres for a color under the second condition, and authenticating the article, if, under a first condition, the area of the security laminate exhibits a color, and under a second condition, the area of the security laminate exhibits a different color. The first condition may include retroreflective light and a first medium exhibiting a specified refractive index in contact with the first plurality of retroreflective microspheres and the second condition may include retroreflective light and a second medium exhibiting a specified refractive index in contact with the second plurality of retroreflective microspheres. The first medium may exhibit a refractive index between 1.00 and 1.20, and the second medium may exhibit a refractive index between 1.25 and 1.35.

Another method of authenticating an article according to the present invention includes the steps of providing a security laminate including a transparent binder layer, a first plurality of dry retroreflective microspheres in a first area, and a second plurality of wet retroreflective microspheres in a second area. The plurality of retroreflective microspheres protrude from the binder layer. The method further includes the steps of exposing the security laminate to a first condition and observing the brightness of the first area and second area under the first condition, exposing the security laminate to a second condition and observing the brightness of the first area and second area under the second condition, and authenticating the article, if, under a first condition, the brightness of the first plurality of retroreflective microspheres is greater than the brightness of the second plurality of microsphere, and under a second condition, the brightness of the second plurality of retroreflective micro spheres is greater than the brightness of the first plurality of retroreflective microspheres. The first condition may include retroreflective light and a first medium exhibiting a specified refractive index in contact with the first plurality of retroreflective microspheres and the second condition may include retroreflective light and a second medium exhibiting a specified refractive index in contact with the second plurality of retroreflective microspheres. The first medium may exhibit a refractive index between 1.00 and 1.20, and the second medium may exhibit a refractive index between 1.25 and 1.35.

Certain terms are used in the description and the claims that may require some explanation.

"Overt security feature" refers to a feature that is easily viewable to the unaided eye. Such features may include holograms and other diffractive optically variable images, embossed images, and color-shifting films.

"Covert security feature" refers to a feature, such as an image, only visible under certain conditions, such as inspection under light of a certain wavelength, polarized light, or retroreflected light.

"Security laminate" refers to a material that may be bonded to a document of value or object of value so that the authenticity of the document of value or object of value may be assessed using the security laminate. A security laminate in combination with adhesive may be referred to as a security label.

"Refractive index" refers to the index of refraction at a wavelength of 589.3 nm corresponding to the sodium yellow d-line, and a temperature of 20° C., except where otherwise specified. The term "refractive index" and its abbreviation "RI" are used interchangeably herein.

"Retroreflective mode" refers to a particular geometry of illumination and viewing that includes engaging an article with a beam of light and viewing the illuminated article from substantially the same direction, for example within 5 degrees, 4 degrees, 3 degrees, 2 degrees, or 1 degree of the illumination direction. "Retroreflective mode" can describe the geometry in which a person views an article or the geometry in which an instrument measures the reflectivity of an article.

"Retroreflective brightness" refers to the effectiveness with which an object or ensemble of objects, for example a retroreflective element or an ensemble of retroreflective elements, or for example an article comprising one or more retroreflective elements, returns incident light back in the direction, or nearly the direction, from which it came. Retroreflective brightness relates to the intensity of light that is retroreflected from an object, versus the intensity of light that is incident on the object.

"Concentric optical interference layer" or "optical interference layer" refers to a translucent or transparent coating surrounding and directly adjacent to essentially the entire surface (i.e., not only a selected portion of the surface, for example only the back surface) of a bead or surrounding and directly adjacent to the outside surface of another, inner concentric optical interference layer, the concentric optical interference layer may be of essentially uniform thickness.

"Area" refers to a roughly bounded part of the space on a surface.

"Retrochromic" refers to the ability of an article, or region, or area thereof, when viewed in retroreflective mode, to exhibit a color that is different than when the object, or region, or area is viewed in diffuse or ambient lighting.

The above summary of the present invention is not intended to describe each disclosed embodiment or every implementation of the present invention. The Figures and the Detailed Description, which follow, more particularly exemplify illustrative embodiments.

BRIEF DESCRIPTION OF THE DRAWINGS

The present invention will be further explained with reference to the appended Figures, wherein like structure is referred to by like numerals throughout the several views, and wherein.

DETAILED DESCRIPTION OF THE INVENTION

Figure 1:
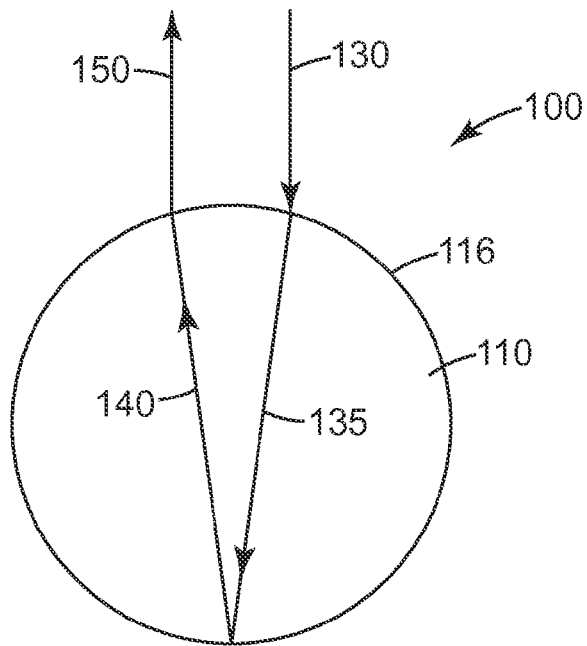
FIG. 1 is a sectional view of one embodiment of a retroreflective microsphere suitable for use in the present invention.

Many countries have passport offices, which will issue passport booklets to applicants. Typically, a passport includes multiple pages and one of the pages within the passport booklet is printed with personalization information about the specific applicant, such as their picture, full legal name, nationality, date of birth, etc., and certain passport identifying information, such as a machine-readable zone or barcode. After the information is printed, some passport offices will apply a security laminate over the printed information to assist in identifying and authenticating the passport. This security laminate may further help to indicate that the information may have been tampered with at a later date. This lamination process usually requires special equipment using heat and pressure to laminate the security film to the printed passport page. One example of such a security film is commercially available from 3M Company based in St. Paul, Minn. as 3M Confirm™ Security Laminate. This security film includes covert images that are visible when viewed with a 3M Retroviewer, which includes a focused light, which assists in identifying and authenticating a valid passport. In addition, if a counterfeiter tries to change the printed information under the laminated security film, the 3M Confirm™, the film will likely be damaged, possibly destroying the covert image, and thus indicating tampering has occurred.

Security laminates and security labels may also be used to verify the authenticity of an object of value. The security laminate may assist in indicating whether the object has been tampered with or whether the object is counterfeit. A security laminate or security label may be applied to any suitable object of value, and the authenticity of the object of value may be questioned if the security laminate or security label does not provide the expected overt or covert security feature.

Security features such as retroreflective patterns can be especially useful in protecting against counterfeiting, alteration, duplication, and simulation of documents of value and objects of value, especially where the retroreflective pattern provides a covert security feature. Many retroreflective security laminates provide an image, such as a retroreflective pattern, that is considerably brighter in retroreflective lighting than non-retroreflective portions of the laminate. Using a collimated light tool, such as a 3M Retroviewer, available from 3M Company of St. Paul, Minn., the identification of such an image allows for the immediate authentication of the laminate, while the absence of the image or the presence of a modified image would indicate tampering or falsification of the laminate.

Hiding power and contrast are often viewed as significant features in retroreflective security articles. Hiding power is the ability to hide underlying indicia when viewed under retroreflective lighting. The ability of retroreflective microspheres to hide indicia is related to the retroreflective brightness exhibited by the retroreflective microspheres under a particular condition. Indicia positioned below retroreflective microspheres may be partially or completely unreadable due to the retroreflective brightness of the microspheres, in which case the indicia is said to be hidden. Contrast is exhibited by a laminate that has areas of retroreflective microspheres over portions of the laminate such that when the laminate is viewed under retroreflective light, the reflection from the areas containing the retroreflective microspheres is significantly brighter than from the non-retroreflective areas of the laminate. Contrast can also be exhibited by a laminate containing different types of retroreflective microspheres wherein the different type of retroreflective microspheres reflect light differently under different viewing conditions.

Poor hiding power may make authentication difficult, if data interferes with a retroreflective pattern and background, for example, or if a switching effect described herein is difficult to observe. Poor contrast, such as low retroreflective intensity or color difference relative to the background, for example, refers to a retroreflective pattern that is less discernable, and which may make authentication more difficult.

A security laminate or security label according to the present invention may be used with any suitable article. For example, security laminates and labels according to the present invention may be used with pharmaceuticals, chemical products, and electrical accessories packaged in paper board cartons or containers, bottles, squeeze tubes, LDPE and HDPE containers, and polybags, for example. Security laminates and labels may also be used with, for example, automotive parts and packaging, printing components such as cartridges, ribbons, printers and printer components, or computers and computer accessories, mobile phones and personal devices. Documents and articles of value including personalization data may also be secured using a security laminate or security label according to the present invention. Such items may include drivers' licenses, passports, license plates, insurance documents, and other certificates, security documents, or documents of value.

The retroreflective brightness of a beaded construction can depend strongly on the refractive index of the bead and the medium that light incident on the bead enters from. When the bead is exposed to dry conditions (e.g. air) the principles of optics predict the optimum refractive index for a microsphere having a specular reflector to be about 1.9 to 1.93. However when the microsphere surface is covered with water, the optimum refractive index is predicted to be much higher (2.55 to 2.65). Thus, by using a mixture of about 1.9 refractive index and about 2.55 to 2.65 refractive index microspheres with specular reflectors coated thereon, retroreflection in both dry and wet conditions can be achieved.

The present invention provides a security laminate having features that protect against counterfeiting, alteration, duplication, and simulation. In a first embodiment, a security laminate has a transparent binder layer, a first plurality of retroreflective microspheres in a first area, and a second plurality of retroreflective microspheres in a second area. The first plurality of retroreflective microspheres and the second plurality of retroreflective microspheres may, for example, include dry retroreflective microspheres and wet retroreflective microspheres, respectively. The first plurality of retroreflective microspheres and the second plurality of retroreflective microspheres affect incident light differently and thus, under different conditions, appear different to a viewer, as described below in reference to FIGS. 4a through 4c. As a result, the security laminate according to the present invention exhibits a "switching effect," which may be observed by a viewer to authenticate an article to which the security laminate is affixed.

In a first exemplary embodiment, the switching effect provided by a security laminate is observed when, under a particular condition, the first plurality of retroreflective microspheres hide indicia below the first plurality of retroreflective microspheres, while indicia under the second plurality of retroreflective microspheres may remain viewable, and under a different condition, the effects are switched. That is, under the different condition, the second plurality of retroreflective microspheres will hide indicia below the second plurality of retroreflective microspheres, while indicia under the first plurality of retroreflective microspheres remains viewable.

In a second exemplary embodiment, under a particular condition, the brightness of the first plurality of retroreflective microspheres is greater than the brightness of the second plurality of retroreflective microspheres. Under a different condition, the brightness of the second plurality of retroreflective microspheres is greater than the brightness of the first plurality of retroreflective microspheres.

A viewer may authenticate an article to which a security laminate of the present invention is attached by observing this switching effect that occurs when the first plurality of retroreflective microspheres switches from at least partially hiding indicia below the first plurality of microspheres, for example, or switching from a high retroreflective brightness to a low or no retroreflective brightness, for example.

In a second exemplary embodiment, the present invention provides a security laminate having a transparent binder layer and a plurality of retroreflective microspheres including dry retroreflective microspheres and wet retroreflective microspheres positioned in the same area of the security laminate. At least a portion of the plurality of retroreflective microspheres may comprise one or more concentric optical interference layers. The area of the security laminate having a plurality of such retroreflective microspheres exhibits different colors under different conditions, as described herein in reference to FIGS. 6a through 6c. As a result, the area of the security laminate exhibits a switching effect by exhibiting a color or is transparent to a viewer under a first condition and a different color to the viewer under a second condition. A viewer may authenticate an article to which the security laminate is affixed by observing the switching effect described herein.

FIG. 1 provides an illustrative embodiment of a retroreflective microsphere 100 that may be used with the security laminate of the present invention. The retroreflective microsphere 100 includes a transparent bead 110 that is substantially spherical. Light is reflected at interfaces between materials possessing different refractive indexes, for example, materials having a difference in refractive indexes of at least 0.1. A sufficient difference in the refractive indexes of the transparent bead 110 and a medium from which the retroreflective microsphere is protruding from may result in a reflection at first interface 116.

Incident light 130 is shown in FIG. 1 is directed at retroreflective microsphere 100. A portion of the incident light 130 may be reflected at first interface 116. Retroreflection results from the portion of incident light 130 that enters the transparent bead 110 and is focused by refraction onto the opposite side of the transparent bead 110. The refracted light 135 encounters first interface 116 at the back of transparent bead 110, some of refracted light 135 may be reflected back as reflected light 140 towards the front of the retroreflective microsphere 100 where it ultimately emerges from the retroreflective microsphere as retroreflected light 150 in a direction that is substantially anti-parallel to incident light 130. A portion of incident light may not be reflected in the manner described but passes entirely through the transparent bead 110 (not shown). Another portion of the incident light may be reflected from the front surface of the retroreflective microsphere and never enters the transparent bead (not shown).

Figure 2:
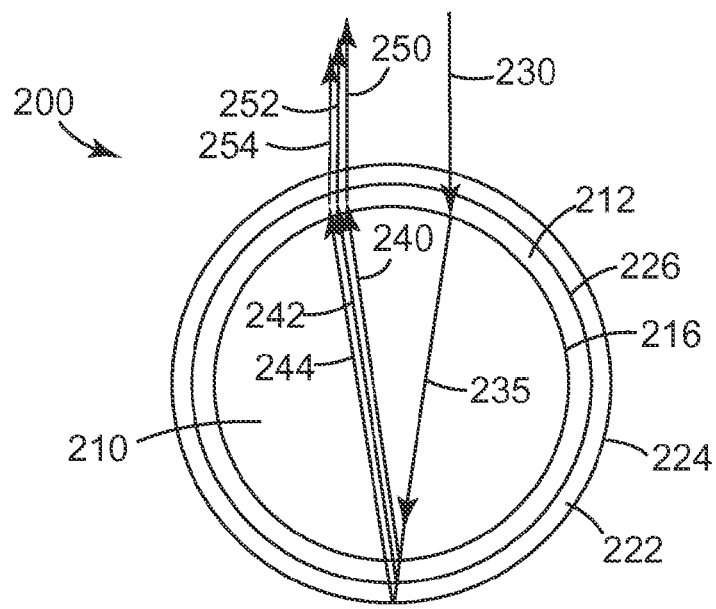
FIG. 2 is a sectional view of one embodiment of a retroreflective microsphere suitable for use in the present invention having two complete concentric optical interference layers.

A security laminate according to the present invention may include retroreflective microspheres having one or more concentric optical interference layers. FIG. 2 provides an exemplary embodiment of a retroreflective microsphere having two concentric optical interference layers that may be incorporated in the security laminate of the present invention. The retroreflective microsphere 200 includes a transparent bead 210 that is substantially spherical and has thereon a first concentric optical interference layer 212. The transparent bead 210 contacts first concentric optical interference layer 212 at a first interface 216. A second concentric optical interference layer 222 overlies the first concentric optical interference layer 212. Second concentric optical interference layer 222 has an interior surface that contacts the exterior or outermost surface of first concentric optical interference layer 212, forming a second interface 226 and an exterior surface that forms the outermost surface of the retroreflective microsphere 200 and provides a third interface 224. In an exemplary embodiment, the first concentric optical interference layer 212 and the second concentric optical interference layer 222 are substantially uniform over the surface of the transparent bead 210.

Light is reflected at interfaces between materials possessing different refractive indexes, for example, materials having a difference in refractive indexes of at least 0.1. A sufficient difference in the refractive indexes of the transparent bead 210 and first concentric optical interference layer 212 may result in a first reflection at first interface 216. Similarly, a sufficient difference in the refractive indexes of first concentric optical interference layer 212 and second concentric optical interference layer 222 may result in a second reflection at second interface 226. A sufficient difference in the refractive indexes of the second concentric optical interference layer 222 and any medium such as a gas, liquid, solid, or vacuum, contacting the second concentric optical interface layer 222 may result in a third reflection at the third interface 224 of the retroreflective microsphere 200.

Incident beam of light 230 is shown in FIG. 2 as being directed at retroreflective microsphere 200. Incident light 230 is largely transmitted through both the second concentric optical interference layer 222 and the first concentric optical interference layer 212 and enters the transparent bead 210. A portion of the incident light 230 may be reflected at third interface 224 or at second interface 226 or first interface 216. Retroreflection results from the portion of incident light 230 that enters the transparent bead 210 and is focused by refraction onto the opposite side of the transparent bead 210. The refracted light 235 encounters first interface 216 at the back of transparent bead 210, some of refracted light 235 is reflected back as reflected light 240 towards the front of the retroreflective microsphere 200 where it ultimately emerges from the retroreflective microsphere as retroreflected light 250 in a direction that is substantially anti-parallel to incident light 230. Similarly, another portion of the focused light passes through the first concentric optical interference layer 212 and is reflected back as reflected light 242 at second interface 226. Reflected light 242 ultimately emerges from the retroreflective microsphere 200 as retroreflected light 252 in a direction that is substantially anti-parallel to incident light 230. Still another portion of the focused light passes through both of the concentric optical interference layers 212 and 222 and is reflected back at third interface 224 as reflected light 244. The exterior surface of the second concentric optical interference layer 222 forms third interface 224 with the medium in which the retroreflective microsphere 200 is disposed, such as a gas, liquid, solid, or vacuum. Reflected light 244 ultimately emerges from the retroreflective microsphere 200 as retroreflected light 254 in a direction that is substantially anti-parallel to incident light 230. A portion of incident light is not reflected in the manner described but passes entirely through the concentrically coated bead (not shown). Another portion of the incident light is reflected from the front surface of the retroreflective microsphere and never enters the transparent bead (not shown).

Interference between reflected light 240, 242, 244 and in turn retroreflected light 250, 252, 254 may give rise to a change in intensity or color of the retroreflected light. A plurality of retroreflective microspheres, such as retroreflective microspheres 200, can provide bright retroreflection, including high coefficient of retroreflection, and/or retrochromic properties that enhance the appearance of an article or provide a desirable covert color, design, message or the like. A desired interference effect can be obtained by manufacturing the retroreflective microsphere 200 with concentric optical interference layers 212 and 222 of different materials and by selecting the thicknesses and refractive indexes of those materials so that the aforementioned retroreflected light 250, 252, 254 desirably interfere with each other.

In some embodiments, the materials, thicknesses and refractive indexes for the concentric optical interference layers 212 and 222, and retroreflective microsphere 200 can provide retroreflected light 250, 252, 254 that is brighter than retroreflected light, in the form of higher coefficient of retroreflection, for example, from uncoated beads, for example. Constructive interference between reflected light 240, 242, 244 and in turn retroreflected light 250, 252, 254 gives rise to increases in the brightness or intensity of the retroreflected light, for example visible retroreflected light. In some embodiments, coating thicknesses for the two optical interference layers can be optimized to provide maximum retroreflectivity when the layers are alternating layers of silica and titania and where the transparent bead comprises a glass bead having a diameter measuring from about 30 µm to about 90 µm. In such embodiments, a first concentric optical interference layer 212 of silica having a thickness between about 85 and 115 nm, and typically about 110 nm, and a second concentric optical interference layer 222 of titania having a thickness between about 45 nm and 125 nm, and typically about 60 nm, has provided significantly enhanced coefficient of retroreflection (Ra) when the retroreflective elements are partially embedded as a monolayer in acrylate adhesive.

Reflection of light at an interface between materials is dependent on the difference in the refractive indexes of the two materials. Materials for the transparent beads and the optical interference layers may be selected from any of a variety of materials, as described herein. The materials may be selected to provide a sufficient difference in refractive indexes between that of the transparent bead 210 and first concentric optical interference layer 212, between the first concentric optical interference layer 212 and second concentric optical interference layer 222, and between the second concentric optical interference layer 222 and a medium which the retroreflective microsphere 200 is exposed to, for example. Each of these differences should be at least about 0.1. In some embodiments, each of the differences between the adjacent layers should be at least about 0.2. In other embodiments, the differences are at least about 0.3, and in still other embodiments, the differences are at least about 0.5. The refractive index of first concentric optical interference layer 212 may be either greater than or less than the refractive index of transparent bead 210. In some embodiments, the choice of refractive index, and the corresponding choice of materials used, will be determined by the medium that contacts the exposed surface of the retroreflective microsphere 200 to form third interface 224.

The refractive indexes of transparent bead 210, first concentric optical interference layer 212, second concentric optical interference layer 222, the binder layer in contact with the retroreflective microsphere 200, and the medium that contacts the exposed surface of retroreflective microsphere 200 are desirably selected to control the focal power of the retroreflective element as well as the strength of reflections from interfaces 216, 226 and 224.

Completely concentrically coated retroreflective microspheres with an exposed surface contacted by air and a rear surface surrounded by a medium having a refractive index of about 1.55, such as a polymer binder, and illuminated with white light, the photopically weighted net intensity of reflected light, to the extent that it is determined by the sequence of transmission and reflection events for antiparallel rays of retroreflected light as they enter and leave the retroreflective element, can vary with coating thickness or thicknesses. The term "photopically weighted net intensity of reflected light" refers to the relative fraction of white light intensity, weighted by the luminosity function, that remains after incident light on a retroreflective element is partially transmitted into the retroreflective element, partially reflected at the back of the retroreflective element, and partially transmitted upon leaving the retroreflective element antiparallel to the incident light direction, accounting only for losses of intensity that result from interfacial reflections and interference effects. When a thin single interference layer of a given material is chosen resulting in a certain index difference at each of the two reflecting interfaces, for example, silica on a 1.93 refractive index transparent bead, the photopically weighted net intensity of reflected light can vary by a factor of at least about 6 depending on the thickness of the coating. The photopically weighted net intensity of reflected light produced by the three interfaces established by two coating layers, for example, of amorphous silica and titania on a 1.93 refractive index transparent bead, can vary by a factor of at least 12, depending on the exact thickness of the two concentric coatings. For some choices of coatings and thicknesses, the photopically weighted net intensity of reflected light can be reduced versus an uncoated retroreflective element.

In some embodiments, the transparent bead 210 may be selected to have an index of refraction suitable for use when the medium in contact with the exposed surface of the retroreflective microsphere 200 is air. In some embodiments, when the medium is air, the index of refraction of the transparent bead 210 is selected to be between about 1.65 and 2.10. In other embodiments, the index of refraction of the transparent bead is selected to be between about 1.7 and about 2.0. In other embodiments, the index of refraction of the transparent bead is selected to be between 1.8 and 1.95. In still other embodiments, the index of refraction of the transparent bead is selected to be between 1.9 and 1.94. Upon selection of a suitable transparent bead 210, the transparent bead may then be first coated with lower refractive index material, between 1.40 and 1.70, for example, to form the first concentric optical interference layer 212, followed by coating with a high refractive index material, between 2.00 and 2.60, for example, to form the second concentric optical interference layer 222.

To provide a retroreflective element having high retroreflectivity under wet conditions, the transparent bead 210 of the retroreflective microsphere 200 may be selected to have an index of refraction typically between about 2.0 and about 2.6. In other embodiments, the index of refraction of the transparent bead is selected to be between 2.3 and 2.6. In still other embodiments, the index of refraction of the transparent bead is selected to be between 2.4 and 2.55. The transparent bead 210 is first coated with a lower refractive index material, between 1.40 and 1.90, for example, to form the first concentric optical interference layer 212, and then coated with a higher refractive index material, between 2.00 and 2.6, for example, to provide a second concentric optical interference layer 222.

The security laminate of the present invention may include retroreflective microspheres having zero, one, more than one, or any suitable combination therein, of complete concentric optical interference layers. Microspheres supporting one or more than one complete concentric optical interference layers may produce retroreflective colors.

Suitable materials and coatings for concentric optical interference layers include those materials and structures that are partially reflective of incident visible light while also permitting at least a portion of the incident light to be transmitted through the material so that the phenomenon of retroreflectivity, as described herein, can occur. In some embodiments, inorganic materials are used to provide transparent coatings that tend to make bright, highly retroreflective articles. Included among the foregoing inorganic materials are inorganic oxides such as $TiO_2$, having a refractive index of approximately 2.2 to 2.7, for example, $SiO_2$ having a refractive index of approximately 1.4 to 1.5, for example, and inorganic sulfides such as ZnS having a refractive index of approximately 2.2, for example. Other suitable materials having a relatively high refractive index include CdS, $CeO_2$, $ZrO_2$, $Bi_2O_3$, ZnSe, $WO_3$, PbO, ZnO, $Ta_2O_5$, and others known to those skilled in the art. Other low refractive index materials suitable for use in the present invention include $Al_2O_3$, $B_2O_3$, $A_1F_3$, MgO, $CaF_2$, $CeF_3$, LiF, $MgF_2$ and $Na_3AlF_6$, and others known to those skilled in the art.

Figure 3A:
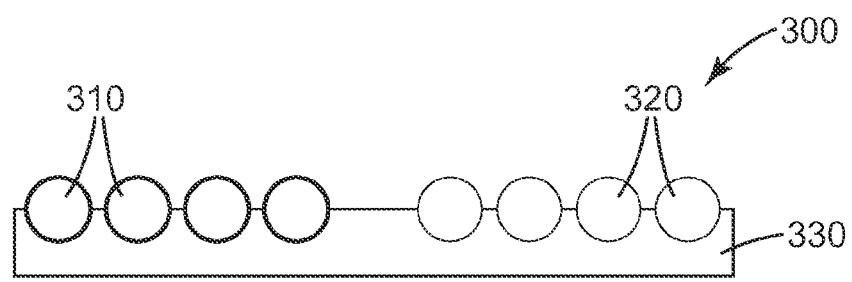
FIGS. 3a-3c provide sectional views of exemplary embodiments of a security laminate according to the present invention.

Referring now to FIG. 3a, an exemplary embodiment of a security laminate 300 according to the present invention includes a first plurality of retroreflective microspheres 310 in a first area, a second plurality of retroreflective microspheres 320 in a second area, and a transparent binder layer 330. The security laminate 300 may be affixed to a document of value, for example, and may be positioned over personalization data, identification data, or other indicia.

Figure 3B:
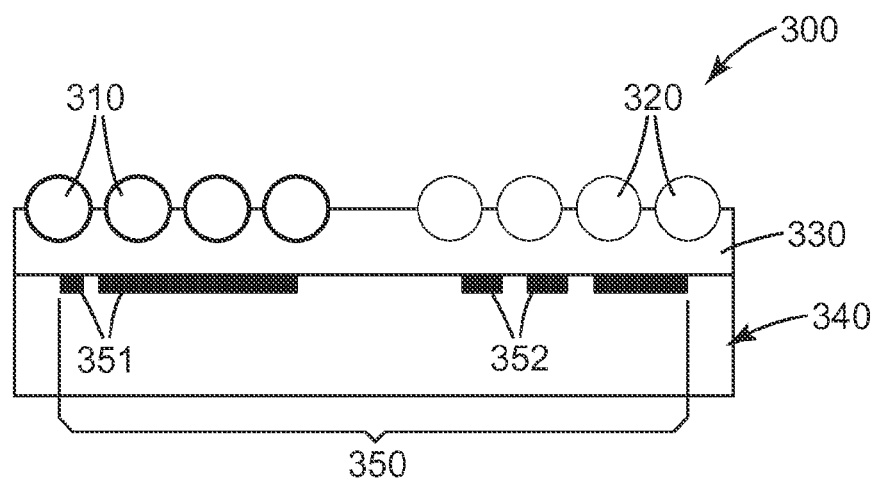

Another exemplary security laminate 300 according to the present invention, in addition to those elements and characteristics described above, includes a substrate 340 with indicia 350 thereon, as illustrated in FIG. 3b. The substrate 340 may be made of or include any suitable material including, for example, paper, polycoated paper, or polyethylene terephathalate, or any combination thereof. The indicia 350 may include a first portion 351 and a second portion 352. The first plurality of retroreflective microspheres 310 is in a first area positioned above the first portion of the indicia 351 and the second plurality of retroreflective microspheres 320 is in a second area positioned above the second portion of the indicia 352. Alternatively, indicia 351 and indicia 352 may be viewed as two separate or distinct indicia, as opposed to two different portions of a single indicia.

The indicia 350 may be or include any combination of words, numbers, symbols, images, or the like, such as personalization data, identification data, or other data, for example. The first portion 351 and second portion 352 may be visibly distinct, for example. Alternatively, the first portion 351 and second portion 352 may be denoted by relative position to the first and second plurality of retroreflective microspheres. That is, in an exemplary embodiment, the first portion of the indicia 351 is that portion of the indicia below the first plurality of retroreflective microspheres 310 and the second portion of the indicia 352 is that portion of the indicia below the second plurality of retroreflective microspheres 320.

Figure 3C:
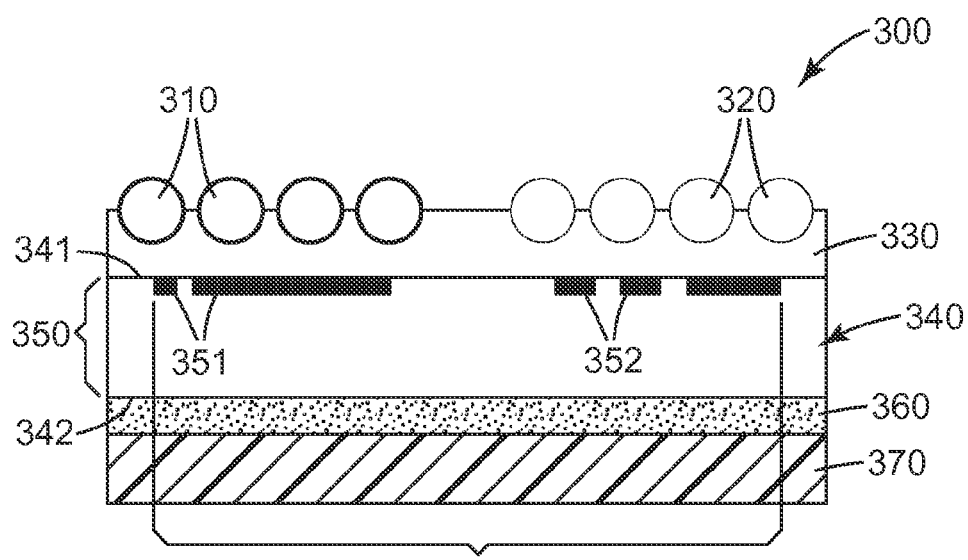

In another exemplary embodiment, the security laminate 300 according to the present invention, in addition to those elements and characteristics described above, includes an adhesive layer 360 and a release liner 370, as illustrated in FIG. 3c. The substrate 340 includes a first major surface 341 and a second major surface 342 opposite the first major surface 341. The transparent binder layer 330 is on the first major surface 341 of the substrate and the adhesive layer 360 is on the second major surface 342 of the substrate 340.

The first plurality of retroreflective microspheres 310 and the second plurality of retroreflective microspheres 320 may protrude from the transparent binder layer 330. In an exemplary embodiment, the retroreflective microspheres are half embedded in the transparent binder layer. In other exemplary embodiments, the retroreflective microspheres may be mostly surrounded by the binder layer, mostly protruding from the binder layer, equally surrounded by and protruding from the binder layer, or any combination thereof.

The transparent binder layer 330 may include or be made of any suitable material, such as UV curable materials or thermally curable materials. In an exemplary embodiment, the binder layer is transparent, non-light scattering, and non-reflective, and may be, for example, a clear, colorless polymer. A transparent, non-light scattering, and non-reflective binder layer allows light to pass through such that a layer below the binder layer may be viewed under appropriate conditions. A binder layer that is substantially pigmented, opaque, or otherwise inhibiting of light passing through the binder layer prevents viewing of personalization data, for example, on a layer below.

In an exemplary embodiment, the first plurality of retroreflective microspheres 310 includes dry retroreflective microspheres that may exhibit retroreflective properties under a dry condition, for example, a condition under which exposed retroreflective microspheres are not in contact with a liquid. Dry retroreflective microspheres may be those microspheres including a transparent bead having a refractive index between approximately 1.65 and 2.1. In an exemplary embodiment, the dry retroreflective microspheres include a transparent bead having an index of refraction between approximately 1.90 and 1.95. The transparent bead may be coated with one or more concentric optical interference layers. In an exemplary embodiment, the transparent bead may be first coated with a material having a refractive index between approximately 1.4 to 1.7, and subsequently coated with a material having a refractive index between approximately 2.0 to 2.6, for example.

In an exemplary embodiment, the second plurality of retroreflective microspheres 320 includes retroreflective microspheres that exhibit retroreflective properties under wet conditions, for example, when exposed retroreflective microspheres are in contact with a liquid such as water or Fluorinert Electronic Liquid FC-43, commercially available from 3M Company of St. Paul, Minn., for example. In an exemplary embodiment, wet retroreflective microspheres include a transparent bead having a refractive index between approximately 2.3 and 2.6. The transparent bead may be first coated with a material having a refractive index between approximately 1.4 to 1.9, and subsequently coated with a material having a refractive index between approximately 2.0 to 2.6, for example.

Figure 4A:
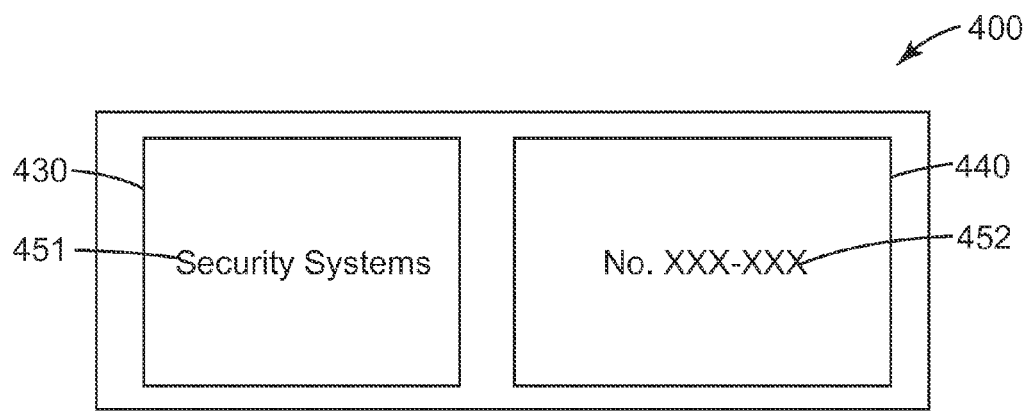
FIGS. 4a-4c provide top views of an exemplary security laminate according to the present invention under various conditions.

In a first embodiment of the security laminate of the present invention, the first plurality of retroreflective microspheres 310 are in a first area 430, and the second plurality of retroreflective microspheres 320 are in a second area 440. The first and second areas, 430 and 440, form roughly bounded parts of the space on a surface of the security laminate, as illustrated in FIG. 4a. The first area may include at least a portion having only dry retroreflective microspheres, and the second area may include at least a portion having only wet retroreflective microspheres. The arrangement of dry retroreflective microspheres in a first area, and wet retroreflective microspheres in a second area is convenient for providing a security laminate that allows for authentication of a document of value to be determined by observing a switching effect. That is, under a particular condition, dry retroreflective microspheres may affect incident light differently than wet retroreflective microspheres, thus resulting in a security laminate appearing differently to a viewer under various conditions.

Figure 4B:
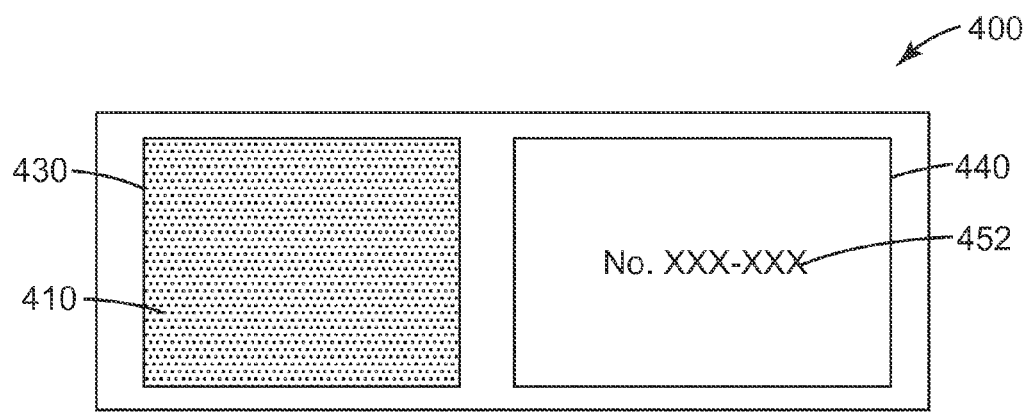
Figure 4C:
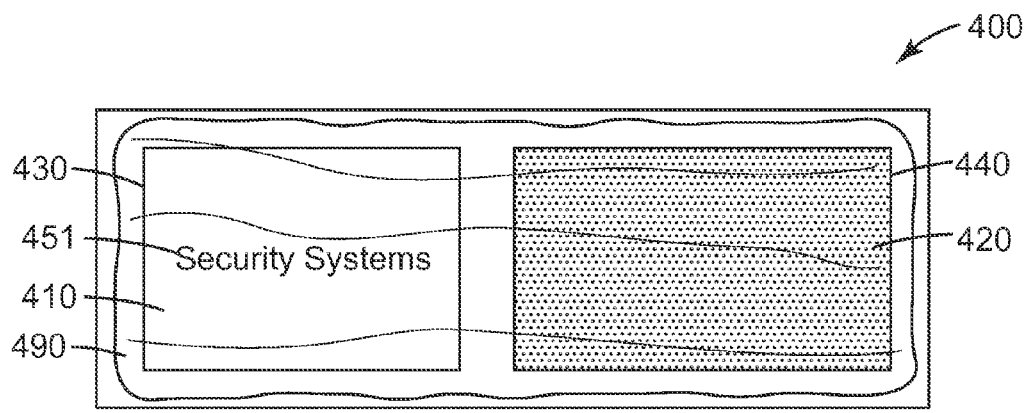

FIGS. 4a through 4c illustrate the switching affect exhibited by the security laminate 400 under three conditions. Under a particular condition, the brightness of the first plurality of retroreflective microspheres 410 is greater than the brightness of the second plurality of retroreflective microspheres 420. Under a different condition, the brightness of the second plurality of retroreflective microspheres 420 is greater than the brightness of the first plurality of retroreflective microspheres 410. In essence, a viewer observes a switching effect when the first plurality of retroreflective microspheres exhibit a brightness greater than the second plurality of retroreflective microspheres, due to its effect on incident light under a particular condition, and switches to exhibit a brightness less than the second plurality of retroreflective microspheres due to its effect on incident light under a different condition.

The switching effect at least partially hides a layer below a plurality of retroreflective microspheres and binder layer, such as a substrate having indicia. As a result of this partial hiding effect, a viewer would not be able to view indicia on a substrate below the plurality of retroreflective microspheres, for example. Under a first condition (FIG. 4a), the first portion of the indicia 451 and second portion of the indicia 452 are viewable. Under a second condition (FIG. 4b), the first plurality of retroreflective microspheres 410 in a first area 430 at least partially hides the first portion of the indicia 451 and the second portion of the indicia 452 is viewable. Under a third condition (FIG. 4c), the second plurality of retroreflective microspheres 420 in a second area 440 at least partially hides the second portion of the indicia 452 and the first portion of the indicia 451 is viewable.

In one embodiment, the first condition may include ambient light and a first medium having a specified refractive index in contact with the first and second plurality of retroreflective microspheres. The first medium may be air, or any other suitable medium exhibiting a refractive index between 1.00 and 1.20, for example. When viewed under ambient or diffuse lighting, the first and second plurality of retroreflective microspheres in a first area 430 and second area 440, respectively, will appear substantially transparent. As a result, the layer below the retroreflective microspheres and binder layer is viewable. For example, a first portion of the indicia 451 and a second portion of the indicia 452 are viewable.

A second condition may include retroreflective light and a second medium having a specified refractive index, in contact with the first and second pluralities of retroreflective microspheres. The second medium may be air, or any other suitable medium exhibiting a refractive index between 1.00 and 1.20, for example. When viewed in retroreflective mode, the retroreflective brightness of the first plurality of retroreflective microspheres 410 is greater than the retroreflective brightness of the second plurality of retroreflective microspheres. Due to the retroreflective brightness, the first plurality of retroreflective microspheres 410 at least partially hides the first portion of the indicia 451, and the second portion of the indicia 452 is viewable. That is, when the security laminate 400 is viewed in retroreflective mode, the first portion of the indicia 451 is at least partially hidden from view as a result of the retroreflective brightness of the first plurality of retroreflective microspheres 410. The second plurality of retroreflective microspheres exhibit a retroreflective brightness lower than that of the first plurality of retroreflective microspheres 410 due to the refractive index of the second medium in contact with the first and second pluralities of retroreflective microspheres. As a result, the second portion of the indicia 452 remains viewable.

A third condition may include retroreflective light and a third medium 490 having a specified refractive index. The third medium may be water, Fluorinert Electronic Liquid FC-43, available from 3M Company of St. Paul, Minn., or any other suitable medium exhibiting a refractive index between 1.25 and 1.35. When viewed in retroreflective mode, the retroreflective brightness of the second plurality of retroreflective microspheres 420 is greater than the retroreflective brightness of the first plurality of retroreflective microspheres. Due to the retroreflective brightness, the second plurality of retroreflective microspheres 420 at least partially hides the second portion of the indicia 452, and the first portion of the indicia 451 is viewable. That is, when the security laminate 400 is viewed in retroreflective mode, the second portion of the indicia 452 is at least partially hidden from view as a result of the retroreflective brightness of the second plurality of retroreflective microspheres 420. The first plurality of retroreflective microspheres exhibit a retroreflective brightness lower than that of the second plurality of retroreflective microspheres 420 due to the refractive index of the third medium 490 in contact with the first and second pluralities of retroreflective microspheres. As a result, the first plurality of retroreflective microspheres 410 appears substantially transparent and the first portion of the indicia 451 remains viewable.

In order to achieve the effects described herein, both the first and second pluralities of retroreflective microspheres are preferably completely in contact with the medium. Dry retroreflective microspheres may exhibit retroreflective properties only under dry conditions while wet retroreflective microspheres may exhibit retroreflective properties only under wet conditions. The differing levels of retroreflective brightness will be most apparent to a viewer, and the security laminate of the present invention will best facilitate authentication of a document of value to which it is attached, when both the first and second pluralities of retroreflective microspheres are in contact with the same medium.

The authenticity of a document of value or object of value, for example, to which a security laminate according to the present invention is attached, can be determined by observing the switching effect described herein.

In an exemplary method, an article may be authenticated by providing a security laminate as described herein, where a first plurality of retroreflective microspheres is in a first area positioned over a first portion of the indicia, and a second plurality of retroreflective microspheres is in a second area positioned over second portion of the indicia. The viewability of the first portion of the indicia and second portion of the indicia is observed after the security laminate is exposed to a particular condition. For example, a method according to the present invention of authenticating an article includes exposing the security laminate to a first condition and observing the security laminate under the first condition to determine the viewability of the first portion of the indicia and the second portion of the indicia, exposing the security laminate to a second condition and observing the security laminate under the second condition to determine the viewability of the first portion of the indicia and the second portion of the indicia, and exposing the security laminate to a third condition and observing the security laminate under the third condition to determine the viewability of the first portion of the indicia and the second portion of the indicia. The article may then be authenticated, if, under the first condition, the first portion of the indicia and the second portion of the indicia are viewable, under the second condition, the first plurality of retroreflective microspheres at least partially hides the first portion of the indicia and the second portion of the indicia is viewable, and under the third condition, the first portion of the indicia is viewable and the second plurality of retroreflective microspheres at least partially hide the second portion of the indicia.

In an exemplary embodiment, the first condition includes ambient light and a first medium exhibiting a specified refractive index in contact with the first and second pluralities of retroreflective microspheres, the second condition includes retroreflective light and a second medium exhibiting a specified refractive index in contact with the first plurality of retroreflective microspheres, and the third condition includes retroreflective light and a third medium exhibiting a specified refractive index in contact with the second plurality of retroreflective microspheres. The first medium may be air, or any other suitable medium exhibiting a refractive index between 1.00 and 1.20, for example. The second medium may be air, or any other suitable medium exhibiting a refractive index between 1.00 and 1.20, for example. The third medium may be water, Fluorinert Electronic Liquid FC-43, available from 3M Company of St. Paul, Minn., or any other suitable medium exhibiting a refractive index between 1.25 and 1.35.

In another method according to the present invention of authenticating an article, a security laminate, such as the security laminate illustrated in FIG. 3a, is provided. The security laminate does not include a substrate having indicia thereon. In addition to the steps described above, the method of authenticating an object includes affixing the security laminate over personalization data, identification data, or other indicia, on a document of value, such that the first plurality of microspheres in a first area are positioned over a first portion of the indicia and the second plurality of microspheres in a second area are positioned over a second portion of the indicia. The security laminate may then be exposed to various conditions, and the viewability of the first portion of indicia and second portion of indicia is observed. The authenticity of the article may be determined if the switching effect, as described herein, is observed.

In another exemplary method according to the present invention of authenticating an article, an article may be authenticated by observing, under particular conditions, the relative brightnesses of the first plurality of retroreflective microspheres and the second plurality of retroreflective microspheres. An article may be authenticated by providing a security laminate as described herein, where a first plurality of retroreflective microspheres is in a first area, and a second plurality of retroreflective microspheres is in a second area. The relative brightness of the first portion of the indicia and second portion of the indicia is observed after the security laminate is exposed to a particular condition. For example, a method according to the present invention of authenticating an article includes exposing the security laminate to a first condition and observing the brightness of the first area and second area under the first condition, and exposing the security laminate to a second condition observing the brightness of the first area and second area under the second condition. The article may then be authenticated, if, under the first condition, the brightness of the first area is greater than the brightness of the second area, and under the second condition, the brightness of the second area is greater than the brightness of the first area.

In an exemplary embodiment, the first condition includes retroreflective light and a first medium exhibiting a specified refractive index in contact with the first plurality of retroreflective microspheres, and the second condition includes retroreflective light and a second medium exhibiting a specified refractive index in contact with the second plurality of retroreflective microspheres. The first medium may be air, or any other suitable medium exhibiting a refractive index between 1.00 and 1.20, for example. The second medium may be water, Fluorinert Electronic Liquid FC-43, available from 3M Company of St. Paul, Minn., or any other suitable medium exhibiting a refractive index between 1.25 and 1.35.

In all methods of authenticating an article described herein, the first, second, and third conditions are exemplary and need not occur in a specified sequence. The article may be authenticated when the described switching effect occurs, and the sequence in which the switching effect occurs is determined by the characteristics of the retroreflective microspheres and the first, second and third conditions.

Figure 5A:
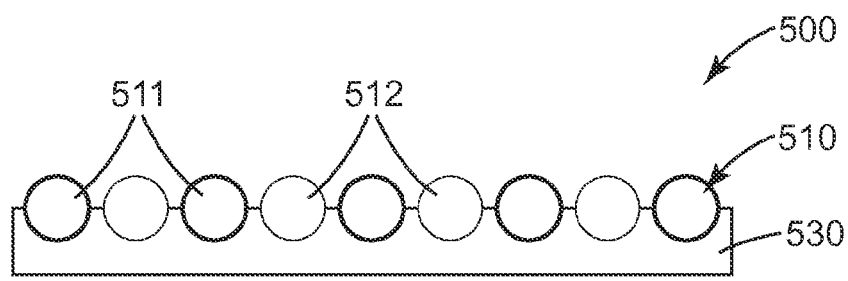
FIGS. 5a-5c provide sectional views of exemplary embodiments of a security laminate according to the present invention.

Referring now to FIG. 5a, an exemplary security laminate 500 according to the present invention includes a transparent binder layer 530 and a plurality of retroreflective microspheres 510. The plurality of retroreflective microspheres 510 includes dry retroreflective microspheres 511 and wet retroreflective microspheres 512.

Figure 5B:
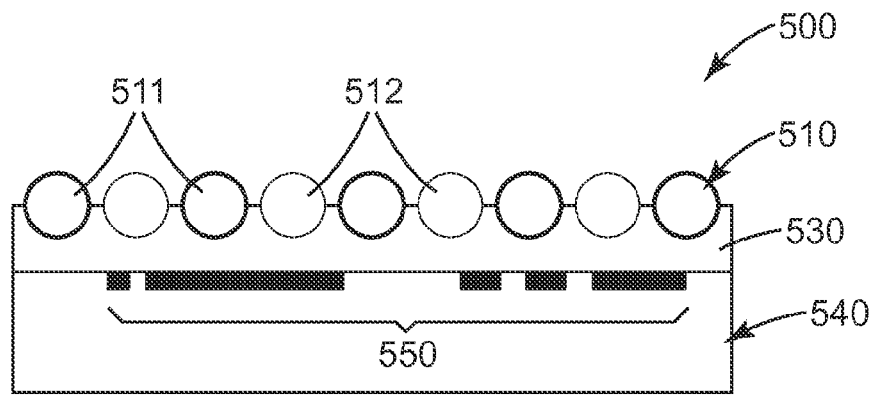

Another exemplary security laminate 500 according to the present invention, in addition to those elements and characteristics described above, includes a substrate 540 with indicia 550 thereon, as illustrated in FIG. 5b.

Figure 5C:
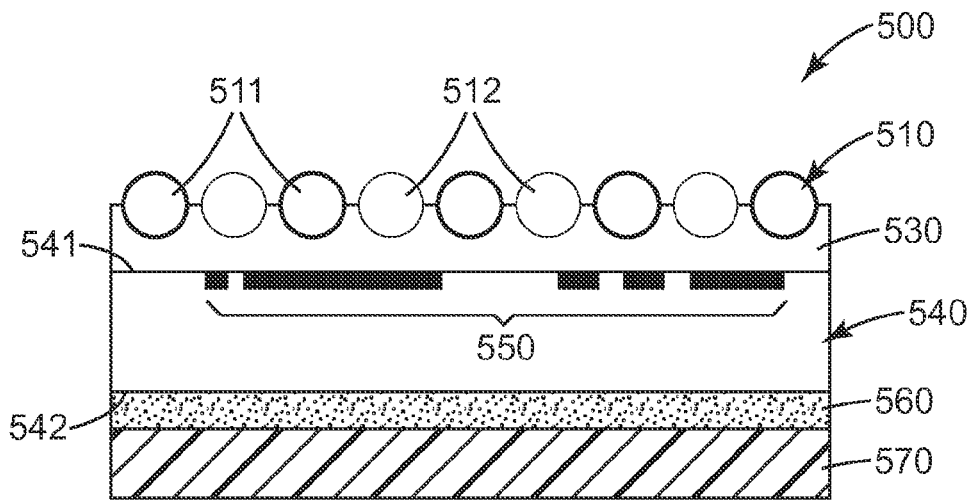

In yet another exemplary embodiment, the security laminate 500 according to the present invention, in addition to those elements and characteristics described above, includes an adhesive layer 560 and a release liner 570, as illustrated in FIG. 5c. The substrate 540 includes a first major surface 541 and a second major surface 542 opposite the first major surface 541. The transparent binder layer 530 is on the first major surface 541 of the substrate and the adhesive layer 560 is on the second major surface 542 of the substrate. The plurality of retroreflective microspheres are positioned in an area of the security laminate. For example, the plurality of microspheres may be positioned over identification, personalization, or other data, that is on a substrate of the security laminate, or the plurality of microspheres may be positioned over such data when affixed to a document of value.

At least a portion of the plurality of retroreflective microspheres 510 in an exemplary security laminate includes one or more complete concentric optical interference layers. Interference between reflected light and retroreflected light due to the presence of the one or more complete concentric optical interference layers, for example reflected light 240, 242, and 244 in FIG. 2, and in turn retroreflected light 250, 252 and 254 in FIG. 2, may give rise to a change in intensity or color of the retroreflected light.

Figure 6A:
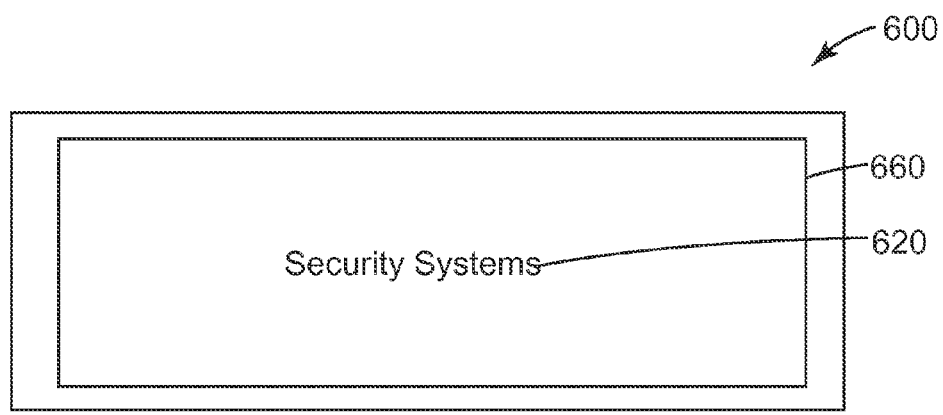
FIGS. 6a-6c provide top views of an exemplary security laminate according to the present invention under various conditions.
Figure 6B:
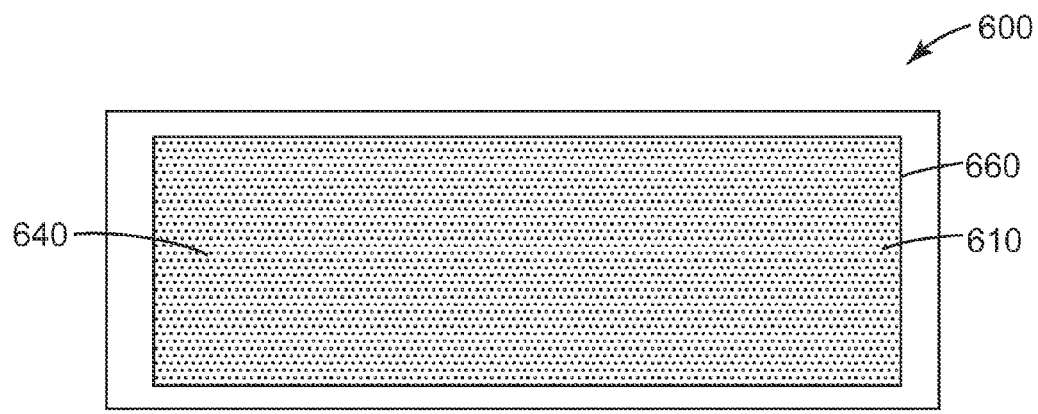
Figure 6C:
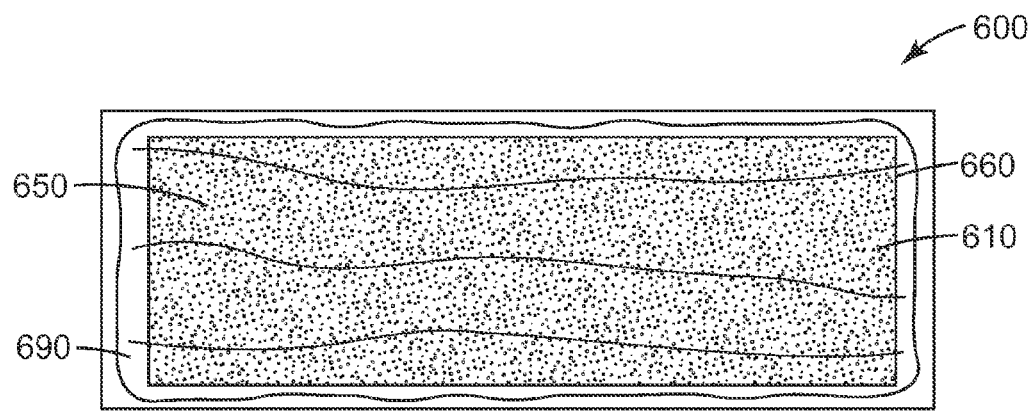

The presence of dry retroreflective microspheres and wet retroreflective microspheres in mixed arrangement in an area creates a switching effect when the area of the security laminate is observed under different conditions, as illustrated in FIGS. 6a through 6c. Under a particular condition, for example, the area 660 of the security laminate having the plurality of retroreflective microspheres exhibits a color 640. Under a different condition, the area 660 of the security laminate having the plurality of retroreflective microspheres exhibits a different color 650. The colors 640 and 650 may include retroreflected light that is white, or colorless, as described herein. A first condition may include ambient light and a first medium having a specified refractive index in contact with the plurality of retroreflective microspheres. The first medium may be air, or any other suitable medium exhibiting a refractive index between 1.00 and 1.20, for example. When viewed under ambient or diffuse lighting, the plurality of retroreflective microspheres in the area 660 will appear substantially transparent. As a result, a layer below the retroreflective microspheres and binder layer is viewable. For example, indicia 620 is viewable.

A second condition may include retroreflective light and a second medium having a specified refractive index, in contact with the plurality of retroreflective microspheres. The second medium may be air, or any other suitable medium exhibiting a refractive index between 1.00 and 1.20, for example. When viewed in retroreflective mode, the dry retroreflective microspheres included in the plurality of retroreflective microspheres 610 exhibits a brightness, due to the effect of the dry retroreflective microspheres on incident light. As a result, the area 660 having the plurality of retroreflective microspheres may exhibit a brightness. Where the dry retroreflective microspheres include retrochromic microspheres, and for example include one or more concentric optical interference layers, the area 660 will exhibit a color 640. A range of colors may be obtained by selection of the complete optical interference layer materials and characteristics, as described herein. Due to the brightness, the plurality of retroreflective microspheres 610 may partially hide a layer below the microspheres, such as a layer having indicia, for example. Under the second condition described herein, the wet retroreflective microspheres included in the plurality of retroreflective microspheres 610 exhibit little or no brightness and remain substantially transparent. The color and brightness exhibited by the area 660 is substantially attributable to the affect of the dry retroreflective microspheres on the light incident on the plurality of retroreflective microspheres 610.

A third condition may include retroreflective light and a third medium 690 having a specified refractive index. The third medium 690 may be water, Fluorinert Electronic Liquid FC-43, available from 3M Company of St. Paul, Minn., or any other suitable medium exhibiting a refractive index between 1.25 and 1.35. When viewed in retroreflective mode, the wet retroreflective microspheres included in the plurality of retroreflective microspheres 610 exhibit a brightness, due to the effect of the wet retroreflective microspheres on incident light. As a result, the area 660 having the plurality of retroreflective microspheres may exhibit a brightness. Where the wet retroreflective microspheres include retrochromic microspheres, and for example include one or more complete concentric optical interference layers, the area 660 exhibits a color 650. Due to the brightness, the plurality of retroreflective microspheres 610 may partially hide a layer below the microspheres, such as a layer having indicia, for example. Under an exemplary third condition as described herein, the dry retroreflective microspheres included in the plurality of retroreflective microspheres 610 exhibit little or no brightness and remain substantially transparent. The color and brightness exhibited by the area 660 is substantially attributable to affect of the wet retroreflective microspheres on the light incident on the plurality of retroreflective microspheres 610.

Under a particular condition, the first plurality of retroreflective microspheres and/or second plurality of retroreflective microspheres may appear colorless. Retroreflective microspheres may appear colorless when color coordinate measurements made by an optical scanner are within 0.01 of a black body radiation curve between 4800 k and 7500 k, where the black body radiation curve passes through white between approximately 4800 k and 7500 k.

The plurality of retroreflective microspheres may include any suitable ratio of dry retroreflective microspheres and wet retroreflective microspheres in any suitable arrangement. In an exemplary embodiment, the plurality of retroreflective microspheres 610 includes even proportions of dry and wet retroreflective microspheres, and the dry and wet retroreflective microspheres are substantially evenly distributed on the area 660 of the security laminate 600. In another exemplary embodiment, a higher proportion of wet retroreflective microspheres may be included in the plurality of microspheres. A higher proportion of wet retroreflective microspheres may result in a switching effect that is more easily observed by a viewer.

The authenticity of a document of value, for example, to which a security laminate according to the present invention is affixed, can be determined by observing the color switching effect described herein.

An article may be authenticated by observing, under particular conditions, the color exhibited by the area having the plurality of retroreflective microspheres. In an exemplary method, an article may be authenticated by providing a security laminate as described herein, where an area is provided on the security laminate having a plurality of retroreflective microspheres including dry retroreflective microspheres and wet retroreflective microspheres. The color of the area having the plurality of retroreflective microspheres is observed after the security laminate is exposed to a particular condition. For example, a method according to the present invention of authenticating an article includes exposing the security laminate to a first condition and observing the area having a plurality of retroreflective microspheres for a color under the first condition, and exposing the security laminate to a second condition and observing the area having a plurality of retroreflective microspheres for a color under the second condition. The article may then be authenticated, if, under a first condition, the area of the security laminate exhibits a color, and under a second condition, the area of the security laminate exhibits a different color.

In an exemplary embodiment, the first condition includes retroreflective light and a first medium exhibiting a specified refractive index in contact with the first plurality of retroreflective microspheres, and the second condition includes retroreflective light and a second medium exhibiting a specified refractive index in contact with the second plurality of retroreflective microspheres. The first medium may be air, or any other suitable medium exhibiting a refractive index between 1.00 and 1.20, for example. The second medium may be water, Fluorinert Electronic Liquid FC-43, available from 3M Company of St. Paul, Minn., or any other suitable medium exhibiting a refractive index between 1.25 and 1.35.

In all embodiments of a security laminate or method of authenticating an article described herein, the ability to observe a switching effect under particular conditions is increased with increased retroreflective brightness of the retroreflective microspheres. The ability of a retroreflective microsphere to hide indicia, for example, positioned below the microsphere, is also increased with increased retroreflective brightness. Materials, thicknesses and refractive indexes for the retroreflective microsphere or the one or more complete concentric optical interference layers may be selected to provide higher retroreflective brightness. Retroreflective microspheres having one or more complete concentric optical interference layers typically exhibit higher retroreflective brightness than uncoated microspheres. Constructive interference between reflected light from the microsphere, for example reflected light 240, 240, and 242 in FIG. 2, and in turn retroreflected light 250, 252 and 254 in FIG. 2 gives rise to increases in the brightness or intensity of the retroreflected light. In some embodiments coating thickness of the complete concentric optical interference Layers can be optimized to provide maximum retroreflectivity. For example, an exemplary embodiment may include three alternating optical interference layers of silica, titania, and silica. The microsphere may be a glass bead having a diameter measuring between approximately 30 μm and 90 μm and having a refractive index between approximately 1.90 and 1.95. In this embodiment, a first optical interference layer may be of silica having a thickness between approximately 95 nm and 120 nm, a second optical interference layer of titania having a thickness between approximately 45 nm and 80 nm, and a third optical interference layer of silica having a thickness between approximately 70 nm and 115 nm.

The construction of retroreflective microspheres may influence whether the retroreflective microspheres exhibit a retrochromic effect. For example, retroreflective microspheres including two complete concentric optical interference layers on a transparent bead having a refractive index of approximately 1.9 may produce significant color when viewed in retroreflective mode where the first complete concentric optical interference layer is silica of a thickness of approximately 110 nm and the second complete concentric optical interference layer is titania of a thickness approximately between 100 nm and 215 nm. Where the titania layer is less than 100 nm, little or no color is observed. It will be appreciated that other materials and constructions of retroreflective microspheres will also provide color or enhanced retroreflective brightness in addition to the foregoing constructions. All such embodiments, in addition to other embodiments described herein, are suitable to be included with a security laminate according to the present invention. The presence of color may increase contrast making the switching effects described herein more apparent and thus facilitating authentication of an article.

The distance from which a security laminate according to the present invention is observed may affect the ability to view the retroreflective brightness and color described herein. In an exemplary embodiment, the retroreflective brightness and color described herein are best observed at a distance of approximately 4 to 6 inches from the security laminate. At significantly greater distances, for example, a distance of several feet, the retroreflective brightness of the security laminate, for example, or the hiding effect described herein, will appear less pronounced. The ability to easily observe the retroreflective brightness and associated switching effect described herein is related to the collimation of the light incident upon the security laminate. If the security laminate is illuminated with highly collimated light, and viewed at an angle close to the angle of illumination, the retroreflective effects described herein may be more easily observed and at greater distances.

In addition to the aforementioned benefits of individual features of a security laminate according to the present invention, security laminates of the present invention provide several benefits unaddressed by traditional security laminates. The security laminate exhibits a switching effect that may be used to authenticate documents of value and other articles. The switching effect may be apparent when water, or another suitable medium, is applied to the security laminate and viewed in retroreflective mode. The security of the article to which the security laminate is affixed is enhanced both by the presence of the covert switching effect as well as the application of water, or other suitable liquid. Application of water to authenticate documents of value may result in damage to a document, for example, having a paper or multilayer substrate. As a result, a security laminate having a security feature incorporating the use of water or other suitable liquid would thus not be suspected by potential counterfeiters.

The security laminate of the present invention may provide a low-cost security laminate with a defined life span. The security laminate provides a low-cost authentication tool for preventing counterfeiting, altering, duplicating or simulating of a document or object of value that may be suitable for single or multi-use applications. Tampering of the security laminate may be readily apparent if the appropriate switching effect is not observed during authentication.

The operation of the present invention will be further described with regard to the following detailed examples. These examples are offered to further illustrate the various specific and preferred embodiments and techniques. It should be understood, however, that many variations and modifications may be made while remaining within the scope of the present invention.

The following procedures were employed for all examples. In the examples, all items identified as '3M' are available from 3M Company, St. Paul, Minn.

Procedure 1: Preparation of Retroreflective Beads

Retroreflective elements with multiple complete concentric optical interference layers were formed by depositing metal oxide (titania or silica) coatings onto transparent bead cores using an atmospheric pressure chemical vapor deposition process (APCVD). Specifics regarding the bead coating process are in accord with the process disclosed in WO 09/105,142, the disclosure of which is incorporated herein by reference thereto. Multiple coatings were deposited by repeating the procedure for samples of retroreflective microspheres (beads) having previously deposited coatings.

Procedure 2: Retroreflected Brightness Measurement

The brightness of the light retroreflected (coefficient of retroreflection (Ra)) from a layer of beads was determined. A single uniform layer of beads were made by sprinkling beads onto an adhesive tape. Sample constructions were prepared by manually pressing and partially embedding the beads in the adhesive of a transparent tape (3M Scotch 375 Clear Tape), and placing the tape, bead side up, on top of a sheet of paper having a dark (black) background. Beads were typically embedded so that on an average slightly less than 50% of the microsphere diameter was embedded in the adhesive of the tape. The coefficient of retroreflection in $Cd/m^2/lux$ was determined according to the procedure established in Procedure B of ASTM Standard E 809-94a (Jan. 1, 2008), measured at an entrance angle of −4.0 degrees and an observation angle of 0.2 degrees. Measurements of retroreflected brightness under 'dry' condition were conducted with the samples exposed to ambient air. Measurements of retroreflected brightness under 'wet' condition were made by applying a layer of liquid over the sample so that the beads were completely covered by the liquid. For the 'wet' condition, different liquids were used to compare the effect of refractive index. Water with a refractive index of 1.33 and 3M Fluorinert Electronic Liquid FC-43 with a refractive index of 1.29 were used.

Examples 1-3

The bead cores used in the preparation of Examples 1-3, referred to herein as Type A bead cores, were transparent glass beads having a refractive index of about 1.93, an average diameter of about 60 μm, and an approximate composition of 42.5% $TiO_2$, 29.4% BaO, 14.9% $SiO_2$, 8.5% $Na_2O$, 3.3% $B_2O_3$, and 1.4% $K_2O$ by weight. Examples 2-3 were prepared according to Procedure 1 and comprised multiple concentric interference layers. Coating materials, coating thicknesses and brightness measurements are summarized in Table 1. The column designated as "Coating Construction" indicates whether there were coatings on the bead cores, and where there were coatings, the sequence of complete concentric optical interference layers on the transparent bead core. Sample constructions were prepared and brightness measured in accord with Procedure 2.

TABLE 1

| Example | Coating Construction | Outermost layer coating material | Estimated outer layer thickness (nm) | Brightness - Air (Cd/m²/lux) | Brightness - Wet (FC 43) Ra (Cd/m²/lux) | Brightness - Wet (water) Ra (Cd/m²/lux) |
|---|---|---|---|---|---|---|
| 1 | none | uncoated | NA | 7.28 | 0.17 | 0.13 |
| 2 | $SiO_2$ | $SiO_2$ | 104 | 16.4 | 0.15 | 0.14 |
| 3 | $SiO_2$:$TiO_2$:$SiO_2$ | $SiO_2$ | 110 | 114.1 | 0.19 | 0.18 |

Examples 4-6

Bead cores, referred to herein as Type B beads, were prepared according to the methods described in U.S. Pat. No. 6,245,700. The Type B beads were made of a glass-ceramic material having a composition of $TiO_2$ 61.3%, $ZrO_2$ 7.6%, $La_2O_3$ 29.1%, ZnO 2% by weight, with RI ~2.42, and an average diameter of about 60 um. Examples 5-6 were prepared according to Procedure 1 and comprised multiple concentric interference layers. Sample constructions were prepared and brightness measured in accord with Procedure 2. Brightness measurements were made of samples in the presence of ambient air, and of the samples with the surface thereof covered by a liquid. Coating materials, coating thicknesses and brightness measurements are summarized in Table 2. The column designated as "Coating Construction" indicates whether there were coatings on the bead cores, and where there were coatings, the sequence of complete concentric optical interference layers on the transparent bead core.

TABLE 2

| Example | Coating Construction | Outermost layer coating material | Estimated outer layer thickness (nm) | Brightness - Air Ra (Cd/m²/lux) | Brightness - Wet (FC 43) Ra (Cd/m²/lux) | Brightness - Wet (water) Ra (Cd/m²/lux) |
|---|---|---|---|---|---|---|
| 4 | none | uncoated | NA | 0.14 | 5.62 | 3.51 |
| 5 | $SiO_2$ | $SiO_2$ | 104 | 1.23 | 10.7 | 5.31 |
| 6 | $TiO_2$:$SiO_2$ | $SiO_2$ | 98 | 0.3 | 20.1 | 9.28 |

Procedure 3: Dry Retrochromic Retroreflective Beads

Dry retrochromic retroreflective elements, hereinafter referred to as Type C beads, were prepared according to Procedure 1. Type A bead cores were coated to provide a first complete concentric optical interference layer of $SiO_2$, a second complete concentric optical interference layer of $TiO_2$, and a third complete concentric optical interference layer of $SiO_2$. The individual layer thicknesses, as measured by scanning electron microscope (SEM) imaging, were 100 nm 1$^{st}$ layer $SiO_2$, 60 nm 2$^{nd}$ layer $TiO_2$ and 100 nm 3$^{rd}$ layer $SiO_2$. Samples were prepared as set forth in Procedure 2. A strong yellow color was observed in 'dry' condition retroreflective viewing. In ambient light 'dry' condition viewing, three-layer retroreflective elements and the Type A bead cores appeared to be colorless.

Procedure 4: Wet Retrochromic Retroreflective Beads

Wet retrochromic retroreflective elements, hereinafter referred to as Type D beads, were prepared according to Procedure 1. Type B bead cores were coated to provide a first complete concentric optical interference layer of $TiO_2$ and a second complete concentric optical interference layer of $SiO_2$. The individual layer thicknesses as measured by SEM imaging were 60 nm 1$^{st}$ layer $TiO_2$ and 100 nm 2$^{nd}$ layer $SiO_2$. Samples were prepared as set forth in Procedure 2. A violet color was observed in retroreflective viewing for the resulting retroreflective elements when covered with a layer of water. In ambient light 'wet' viewing condition, the coated retroreflective elements and the Type B bead cores appeared to be colorless.

Procedure 5: Extrusion Process for Substrate

Films of Primacor 3340 ethylene acrylic acid copolymer (available from Dow Chemical Company, Midland Mich.) were produced using a cast film extrusion process. Primacor resin pellets were fed into a 1.9 cm (¾ in) single screw extruder manufactured by C.W. Brabender Instruments Inc., South Hackensack, N.J., with a melt temperature of about 200° C. (392° F.). A horizontal die was used to cast the extruded film onto a polyethylene terephthalate (PET) base film approximately 15 cm (6 in) wide and 0.05 mm (0.002 in) thick traveling at approximately 3 meters/min (10 ft/min). The resulting film construction was run between a steel chill roll and a rubber backup roll to provide a resin layer having a thickness of approximately 0.1 mm (0.004 in).

Procedure 6: Bead-Printing Process Using UV-Curable Inks

Samples were prepared by stamp printing. A stamp was used to print retroreflective elements in an image pattern onto a substrate (substrate was sheet label stock 7708A, Self Adhesive Laser Labels from DesktopLabels, Minneapolis, Minn.). The stamp was used to print a layer of UV-curable binding resin (available under the designation "9800CL" from 3M Company) with no colorant added to the resin onto the substrate. Immediately following the ink printing, using any of the beads identified above, i.e. Type A beads with or without coatings, Type B beads with or without coatings, Type C beads or Type D beads, beads were carefully sprinkled over the desired regions of the ink printing to form an image pattern of retroreflective elements. The samples were then passed under a strong UV light source (American Ultraviolet Company, Lebanon Ind.) at 100 fpm, exposing the sample to 0.2 J/cm².

Procedure 7: Bead-Printing Process Using Hot Melt Adhesive

Samples were made by heat laminating Primacor substrate film, made per Procedure 5, using a Diletta CPL 90 (temperature set at 135° C., speed setting of 2) onto the sheet label stock described in Procedure 6. Using any of the beads identified above, i.e. Type A beads with or without coatings, Type B beads with or without coatings, Type C beads or Type D beads, the beads were carefully sprinkled onto the resin side of the substrate to form a bead image pattern. The substrate was then heated for 45 seconds in a convection oven set at a temperature of 425° F.

Procedure 8: Retroreflection Characterizations

The following techniques were used to characterize the retroreflectivity and retroreflective contrast of the various types of beads applied to various materials by different methods and over various viewing conditions.

8 (1) Label indicia viewability: Samples were prepared by printing patterns of the different bead types presented above, by either Procedure 6 or 7, over label stock paper with an address written on the label stock. The samples were observed in ambient light and with a 3M Retroviewer at a distance of 4-6 inches before (i.e. beads were exposed to air) and after a thin layer of liquid of refractive index 1.28-1.35 (e.g., water, FC 43) was spread on the label surface. The sample was rated viewable or hidden based on how well the address was viewable when using a Retroviewer. For example, if the address was clearly visible when illuminated with a retroreflective source such as a 3M Retroviewer, the sample was rated viewable. If the address was completely hidden by the retroreflective nature of the beaded substrate, the sample was rated hidden.

8 (2) Retroreflective pattern viewability: Samples were prepared by printing patterns of the different bead types presented above, by either Procedure 6 or 7, onto a piece of standard copy paper. Samples were observed with a 3M Retroviewer at a distance of 4-6 inches before, i.e. beads were exposed to air, and after a thin layer of liquid of refractive index 1.28-1.35 (e.g. water, FC 43 etc.) was spread on the paper surface. The sample was rated viewable or transparent based on how easy it was to see the covert bead pattern in retroreflected light. If the pattern was obvious, then the sample was rated viewable, otherwise it was rated as transparent.

8 (3) Retroreflective pattern color: Samples were prepared by printing patterns of the different bead types presented above, by either Procedure 6 or 7, onto a piece of standard copy paper. Samples were observed with a 3M Retroviewer at a distance of 4-6 inches before, i.e. beads exposed to air, and after a thin layer of liquid of refractive index 1.28-1.35 (e.g. water, FC 43 etc.) was spread on the paper surface, and the color observed was noted. If the pattern did not show any color, such observation were noted as colorless.

The observation conditions for the subsequent tables are:
First Condition Sample observed in ambient air.
Second Condition Sample coated with thin layer of liquid and observed in non-retroreflective light.
Third Condition: Sample coated with thin layer of liquid and observed in retroreflective light.

Example 7

Type C beads made according to Procedure 3 and Type D beads made according to Procedure 4, and Type B wet reflective bead cores were affixed to various areas of the substrate per the process of Procedure 7. An area designated area 1 of the substrate was sprinkled with Type C beads, another area designated area 2 of the same substrate was sprinkled with Type D beads while another area designated area 3 was sprinkled with Type B beads. Viewability of the indicia in ambient light and retro light were evaluated in air and water according to Procedure 8 (1) and are listed in Table 3.

TABLE 3

| Viewability of indicia under area 1 | | | Viewability of indicia under area 2 | | | Viewability of indicia under area 3 | | |
|---|---|---|---|---|---|---|---|---|
| First condition | Second condition | Third condition | First condition | Second condition | Third condition | First condition | Second condition | Third condition |
| viewable | viewable | hidden | viewable | hidden | viewable | viewable | viewable | *partly hidden |

*'partly hidden' - - the indicia, although somewhat viewable, was markedly less so than the viewability of the indicia when rated 'viewable'.

Example 8

Type C yellow retrochromic beads as made according to Procedure 3 and Type B wet reflective beads were sprinkled onto adjacent areas (Area 1 and Area 2) of an ink pattern created by a stamp-printing process as described in Procedure 6. Retroreflective pattern viewability and color effects were evaluated according to Procedures 8 (2)-(3) and are listed in Table 4.

TABLE 4

| Second condition | | Third condition | |
|---|---|---|---|
| Area 1 | Area 2 | Area 1 | Area 2 |
| Viewability of retroreflective pattern | | | |
| viewable | transparent | transparent | viewable |
| Color of retroreflective pattern | | | |
| yellow | transparent | transparent | Colorless |

Example 9

Type C dry retrochromic elements were made according to Procedure 3, and Type D wet retrochromic beads were made according to Procedure 4. The beads were sprinkled onto adjacent areas on an ink pattern created by a stamp-printing process as described in Procedure 6. Retroreflective pattern viewability and color effects were evaluated according to Procedures 8 (2)-(3) and listed in Table 5.

TABLE 5

| Second condition | | Third condition | |
|---|---|---|---|
| Area 1 | Area 2 | Area 1 | Area 2 |
| Viewability of retroreflective pattern | | | |
| viewable | transparent | transparent | viewable |
| Color of retroreflective pattern | | | |
| yellow | n/a | n/a | Violet |

Example 10

Three layer dry reflective Type C beads were made according to Procedure 3. Two layer wet reflective Type D beads were made according to Procedure 4. Regions of a Primacor 3340 ethylene acrylic acid substrate prepared according to Procedure 7 were sprinkled with a 70:30 mixture by weight of the Type C and Type D retroreflective beads. Retroreflective pattern viewability and color effects were evaluated according to Procedures 8 (2)-(3) and listed in Table 6.

TABLE 6

Retroreflective Pattern Properties

| Second condition | | Third condition | |
|---|---|---|---|
| viewability | Color | viewability | Color |
| viewable | yellow | viewable | violet |

The present invention has now been described with reference to several embodiments thereof. The foregoing detailed description and examples have been given for clarity of understanding only. No unnecessary limitations are to be understood therefrom. All patents and patent applications cited herein are hereby incorporated by reference. It will be apparent to those skilled in the art that many changes can be made in the embodiments described without departing from the scope of the invention. Thus, the scope of the present invention should not be limited to the exact details and structures described herein, but rather by the structures described by the language of the claims, and the equivalents of those structures.

What is claimed is:

1. A security laminate, comprising:
a transparent binder layer;
a first plurality of retroreflective microspheres in a first area, the first plurality of retroreflective microspheres comprising dry retroreflective microspheres having a refractive index between about 1.65 and about 2.10; and
a second plurality of retroreflective microspheres in a second area, the second plurality of microspheres comprising wet retroreflective microspheres having an index of refraction of between about 2.0 and about 2.6;
wherein the first plurality of retroreflective microspheres and the second plurality of retroreflective microspheres protrude from the binder layer;
wherein a retroreflective brightness of the first plurality of retroreflective microspheres is greater than a retroreflective brightness of the second plurality of retroreflective microspheres under a first medium that exhibits a refractive index between 1.00 and 1.20; and
wherein a retroreflective brightness of the second plurality of retroreflective microspheres is greater than a retroreflective brightness of the first plurality of retroreflective microspheres under a second medium that exhibits a refractive index between 1.25 and 1.35.

2. The security laminate of claim 1, wherein the first plurality of retroreflective microspheres comprises retrochromic microspheres.

3. The security laminate of claim 1, wherein the first plurality of microspheres comprises one or more concentric optical interference layers.

4. The security laminate of claim 1, further comprising a substrate having indicia thereon positioned below the first plurality of retroreflective microspheres and second plurality of retroreflective microspheres.

5. The security laminate of claim 1, wherein the security laminate is used to authenticate an object to which the security laminate is attached.

6. A security laminate comprising:
a substrate having indicia thereon;
a transparent binder layer;
a first plurality of retroreflective microspheres in a first area positioned over a first portion of the indicia, the first plurality of retroreflective microspheres comprising dry retroreflective microspheres having a refractive index between about 1.65 and about 2.10; and
a second plurality of retroreflective microspheres in a second area positioned over a second portion of the indicia, the second plurality of microspheres comprises wet retroreflective microspheres having an index of refraction of between about 2.0 and about 2.6;
wherein the first plurality of retroreflective microspheres and the second plurality of retroreflective microspheres protrude from the binder layer.

7. The security laminate of claim 6, wherein under a first condition, the brightness of the first plurality of retroreflective microspheres is greater than the brightness of the second plurality of microspheres, and wherein under a second condition, the brightness of the second plurality of retroreflective microspheres is greater than the brightness of the first plurality of retroreflective microspheres.

8. The security laminate of claim 7, wherein the first condition comprises retroreflective light and a first medium exhibiting a specified refractive index in contact with the first and second pluralities of retroreflective microspheres and wherein the second condition comprises retroreflective light and a second medium exhibiting a specified refractive index in contact with the first and second pluralities of retroreflective microspheres.

9. The security laminate of claim 8, wherein the first medium exhibits a refractive index between 1.00 and 1.20, and the third medium exhibits a refractive index between 1.25 and 1.35.

10. The security laminate of claim 6, wherein under a first condition, the first and second portions of the indicia are viewable, wherein under a second condition, the first plurality of retroreflective microspheres at least partially hide the first portion of the indicia and the second portion of the indicia is viewable, and wherein under a third condition, the first portion of the indicia is viewable and the second plurality of retroreflective microspheres at least partially hide the second portion of the indicia.

11. The security laminate of claim 10, wherein the first condition comprises ambient light and a first medium exhibiting a specified refractive index in contact with the first and second pluralities of retroreflective microspheres, wherein the second condition comprises retroreflective light and a second medium exhibiting a specified refractive index in contact with the first and second pluralities of retroreflective microspheres, and wherein the third condition comprises retroreflective light and a third medium exhibiting a specified refractive index in contact with the first and second pluralities of retroreflective microspheres.

12. The security laminate of claim 11, wherein the first medium exhibits a refractive index between 1.00 and 1.20, the second medium exhibits a refractive index between 1.00 and 1.20, and the third medium exhibits a refractive index between 1.25 and 1.35.

13. The security laminate of claim 6, wherein the first plurality of retroreflective microspheres comprise retrochromic microspheres.

14. The security laminate of claim 6, wherein the first plurality of retroreflective microspheres comprises one or more concentric optical interference layers.

15. The security laminate of claim 6, further comprising an adhesive layer, wherein the substrate comprises a first major surface and a second major surface opposite the first major surface, and wherein the transparent binder layer is on the first major surface of the substrate and the adhesive layer is on the second major surface of the substrate.

16. A security laminate comprising,
   a transparent binder layer; and
   a plurality of retroreflective microspheres comprising dry retroreflective microspheres and wet retroreflective microspheres;
   wherein the plurality of retroreflective microspheres protrude from the binder layer and are positioned in an area of the security laminate, at least a portion of the plurality of retroreflective microspheres comprise one or more complete concentric optical interference layers, and wherein under a first condition, the area of the security laminate exhibits a color, and under a second condition, the area of the security laminate exhibits a different color.

17. The security laminate of claim 16, wherein the first condition comprises retroreflective light and a first medium exhibiting a specified refractive index in contact with the plurality of retroreflective microspheres, and wherein the second condition comprises retroreflective light and a second medium exhibiting a specified refractive index in contact with the plurality of retroreflective microspheres.

18. The security laminate of claim 17, wherein the first medium exhibits a refractive index between 1.00 and 1.20 and the second medium exhibits a refractive index between 1.25 and 1.35.

19. The security laminate of claim 16, wherein the dry retroreflective microspheres comprise retrochromic microspheres.

20. The security laminate of claim 16, wherein the security laminate is used to authenticate an object to which the security laminate is attached.

* * * * *